(12) United States Patent
Thomas

(10) Patent No.: US 8,217,546 B2
(45) Date of Patent: Jul. 10, 2012

(54) ELECTRICAL MACHINE AND PERMANENT-MAGNET

(75) Inventor: Arwyn Thomas, Brithdir (GB)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/083,650

(22) Filed: Apr. 11, 2011

(65) Prior Publication Data

US 2011/0248508 A1    Oct. 13, 2011

(30) Foreign Application Priority Data

Apr. 13, 2010 (EP) .................................. 10159785

(51) Int. Cl.
*H02K 21/12* (2006.01)

(52) U.S. Cl. ......... 310/156.46; 310/156.38; 310/154.21; 310/154.22

(58) Field of Classification Search ............. 310/156.46, 310/156.38, 154.21, 154.22; 290/55
See application file for complete search history.

(56) References Cited

U.S. PATENT DOCUMENTS

| | | | | |
|---|---|---|---|---|
| 5,095,238 A | * | 3/1992 | Suzuki et al. | 310/156.46 |
| 5,753,991 A | * | 5/1998 | Couture et al. | 310/156.46 |
| 6,753,632 B1 | | 6/2004 | Hartsfield, Jr. | |
| 6,858,960 B1 | * | 2/2005 | Muszynski | 310/156.47 |
| 7,034,427 B2 | * | 4/2006 | Hirzel | 310/191 |
| 7,183,684 B2 | * | 2/2007 | Miyashita et al. | 310/156.38 |
| 7,425,785 B2 | * | 9/2008 | Domeki et al. | 310/156.45 |
| 7,772,741 B1 | * | 8/2010 | Rittenhouse | 310/257 |
| 2005/0264122 A1 | * | 12/2005 | Domeki et al. | 310/156.46 |
| 2006/0131976 A1 | * | 6/2006 | Kikuchi et al. | 310/156.46 |
| 2008/0055032 A1 | * | 3/2008 | Miyata | 335/306 |
| 2008/0246362 A1 | * | 10/2008 | Hirzel | 310/156.02 |
| 2009/0072639 A1 | * | 3/2009 | Seneff et al. | 310/43 |

FOREIGN PATENT DOCUMENTS

| | | |
|---|---|---|
| EP | 1816725 A1 | 8/2007 |
| JP | 2009136088 A | 6/2009 |

OTHER PUBLICATIONS

Machine translation of foreign document JP 2009136088.*
Jibin Zou et al: "Optimum design of magnet shape in permanent-magnet synchronous motors", IEEE Transactions on Magnetics, IEEE Service Center, New York, US LNKD-DOI: 10.1109/TMAG.2003.815543, vol. 39, No. 6, Nov. 2003, pp. 3523-3526, XP011103987.

* cited by examiner

*Primary Examiner* — Quyen Leung
*Assistant Examiner* — Alex W Mok

(57) ABSTRACT

An electrical machine including a permanent magnet and a coil is provided. The coil is arranged to interact with the permanent magnet via an air gap, which located between the two. Electrical power is generated in the coil when the permanent magnet or the coil is moved in their relative position to each other. The permanent magnet includes a surface, which is aligned to the coil and to the air gap so that that magnetic forces of the permanent magnet interact via the surface and the air gap with the coil by a magnetic flux density distribution. The permanent magnet also includes a base plane and a transition area. A first side of the surface is connected with the adjacent base plane via the transition area. The cross-section of the transition between the surface and the adjacent base plane is determined by a Bezier function.

5 Claims, 2 Drawing Sheets

ELECTRICAL MACHINE AND PERMANENT-MAGNET

CROSS REFERENCE TO RELATED APPLICATIONS

This application claims priority of European Patent Office application No. 10159785.4 EP filed Apr. 13, 2010, which is incorporated by reference herein in its entirety.

FIELD OF INVENTION

The invention relates to an electrical machine, which contains permanent magnets and to the permanent magnets being used. The invention especially relates to a synchronous machine.

BACKGROUND OF INVENTION

An electrical machine like a generator contains a number of permanent magnets, which interact with at least one coil to generate electrical power. For the magnets used a compromise needs to be found. It is necessary to minimize or even avoid at least some of the following problems:

First of all the magnetic force (magnetic field-strength) of the magnets will vary due to their individual characteristics and tolerances. Periodical torque pulsations will occur if the machine is within the status "no-load", "idling" or "full load".

Next the number and/or the size of used permanent magnets needs to be minimised due to the steadily increasing costs.

The torque stated above is denoted as "cogging torque" if the machine is in "no-load"-status, while it is denoted as "ripple torque" if the machine is "load"-status.

The torque pulsations may result in vibrations, which propagates inside the machine and within a used supporting structure of the machine also. The torque pulsations may harm mechanical and electrical components.

Furthermore the torque pulsations may generate acoustic noise with low frequencies. The frequencies are audible and thus disturb the environment, the human-beings and the wildlife.

Especially if a huge direct drive generator is within a wind turbine the disturbance needs to be reduced or even avoided.

Several techniques are known to reduce "cogging torque" or "ripple torque". For example the permanent magnets are shaped specifically or so called "dummy slots" are used inside the electrical machine.

The magnet shaping is advantageous for a given current and a required torque. The magnet shaping can be done in regard to minimize the amount of magnet material needed.

It is also possible to reduce cogging-torque and/or ripple-torque by an optimized shaping of the magnets.

A huge number of optimized magnet-shapes is known in the prior art.

An important and commonly applied one shows upper magnet corners, which are cut away. This is called chamfering. The chamfer angle used may be 45° but also alternative chamfer angles are known in the prior art. However this kind of chamfering does not reduce the cogging-torque and the ripple-torque to a satisfactory level.

Document EP 1 076 921 A1 describes a magnet piece with a cross sectional geometry. The geometry corresponds to the half-cycle arc of a sine curve. It is very difficult and expensive to manufacture this geometry. Even this approximation does not reduce the cogging-torque and the ripple-torque to a satisfactory level.

SUMMARY OF INVENTION

It is therefore the aim of the invention to provide an improved permanent magnet to address the problems mentioned above, and to provide an electrical machine, which contains this type of improved permanent magnet.

This aim is reached by the features of the independent claims.

Preferred configurations are object of the dependent claims.

According to the invention the electrical machine contains a permanent magnet and a coil. The coil is arranged in a way, that it interacts with the permanent magnet via an air gap, which is located between the permanent magnet and the coil. The permanent magnet and the coil are arranged in a way that electrical power is generated in the coil when the permanent magnet or the coil is moved in their relative position to each other.

The permanent magnet contains a surface, which is aligned to the coil and to the air gap in a way, that magnetic forces of the permanent magnet interact via the surface and the air gap with the coil by a magnetic flux density distribution.

The permanent magnet contains a surface, a base plane and a transition area. A first side of the surface is connected with the adjacent base plane via the transition area. The cross-section of the transition between the surface and the adjacent base plane is determined by a Bezier function, which is assigned to and defined by three points at least.

A first point is assigned to the surface, while a second point is assigned to the base plane and while a third point is assigned to the transition area, which is between the surface and the base plane.

This Bezier-function is defined by the three points and is arranged to connect the three points.

Due to these features an optimized magnetic flux density distribution in the air gap and across slots, being used to support the coil, is obtained.

The magnet typically shows a rectangular area, which is located opposite to the shaped surface. The rectangular area results in a base-line within the cross-sectional view of the magnet.

For the surface-optimisation a number of system-parameters should be taken into account—the optimisation should be done in view of:
  a reduced magnet volume within the machine,
  a reduced cogging torque,
  reduced harmonics,
  an improved torque,
  an increased flux density,
  an increased efficiency of the machine, . . . , etc.

Due to the Bezier-function the best compromise between magnet volume, machine efficiency, cogging torque, cogging ripple, demagnetization etc. can be found by an iterative adjustment of a few parameters only. The optimisation is thus fast and effective.

A number of design constraints are given usually due to the overall machine layout: size, magnet foot print, minimum air gap distance, torque, efficiency, . . . , etc.

This number of constraints reduces the complexity of the iterative optimization, too.

The invention is applicable to radial, axial and linear magnetic geometries, even if the permanent magnet moves relative to a "slotted stator"-geometry, for example.

Thus an optimized air gap flux density is provided, reducing the cogging forces between the stator and the magnet pole.

Due to the Bezier-shaped-curve a smooth progressive magnetic surface is generated.

The optimized surface is reached by the use of a computational iteration of three points as shown below in the figures. This provides an optimum shape of the magnet with a minimal cogging torque and torque ripple while the width of the air gap of the machine is maintained preferably.

The resulting magnet shape provides an improved electrical machine output-power, while a narrow magnet pole is reached in view to other topologies of the prior art.

BRIEF DESCRIPTION OF THE DRAWINGS

The invention is shown by help of some drawings now. The drawings show preferred configurations and do not limit the scope of the invention.

FIG. 3 shows the permanent magnet of FIG. 1 and FIG. 2 with a shaped surface according to the invention, while

DETAILED DESCRIPTION OF INVENTION

Figure 1:
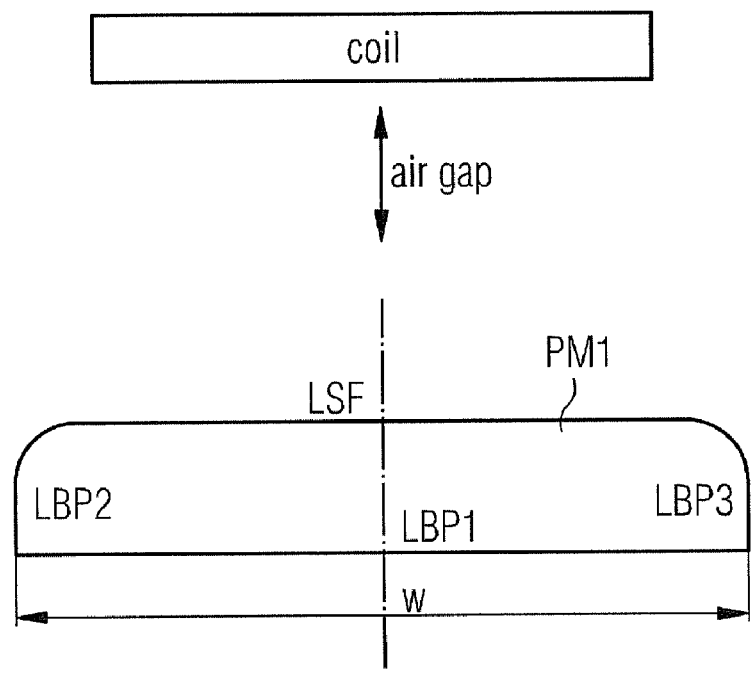
FIG. 1 shows a cross-sectional view of a permanent magnet, which is shaped according to the invention.

FIG. 1 shows a cross-sectional view of a permanent magnet PM1, which is shaped according to the invention.

The cross section of the permanent magnet PM1 contains three linear sections LBP1, LBP2, LBP3. These sections LBP1, LBP2, LBP3 may belong to rectangular areas BP1, BP2, BP3 as shown in FIG. 2 later.

The cross section of the permanent magnet PM1 contains also a line LSF. The line LSF is shaped according to a Bezier-function at their edges, while the edges are assigned to a transition area between the surface of the magnet and adjacent base planes as shown in FIG. 2 later.

Thus the line LSF is converted to the adjacent linear sections LBP2 and LBP3 by help of the Bezier-function or Bezier-curve.

Figure 2:
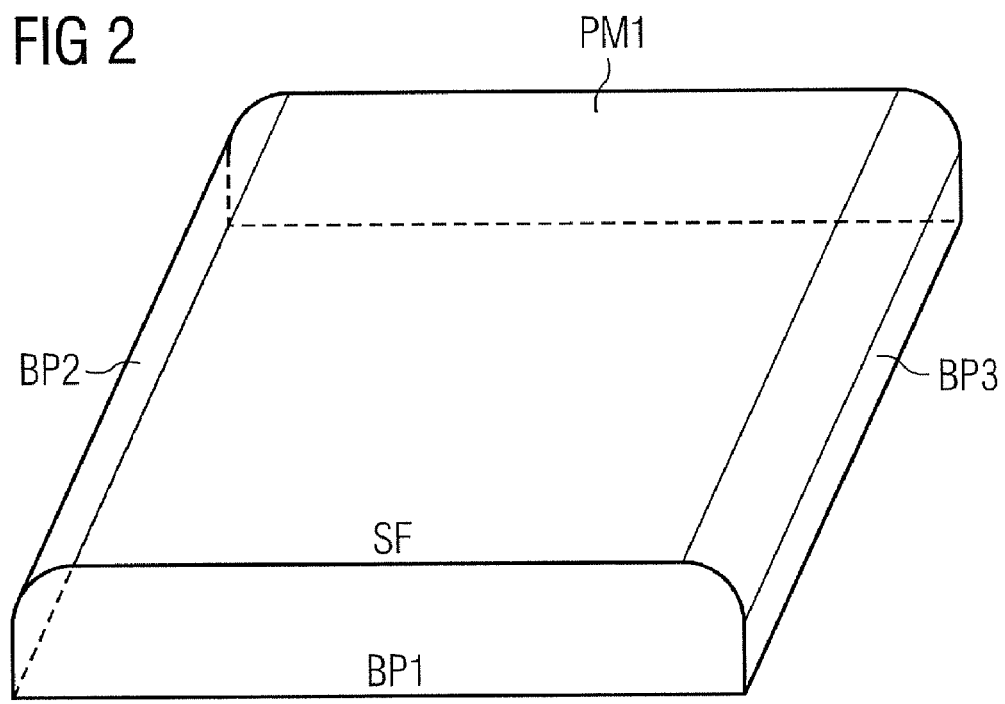
FIG. 2 shows a perspective view of the permanent magnet referring to FIG. 1.

The surface line LSF belongs to a surface SF of the permanent magnet PM1 as shown in FIG. 2 later.

The shaped surface is aligned to a coil and to an air gap, which is between the permanent magnet PM1 and the coil.

FIG. 2 shows a perspective view of the permanent magnet PM1 referring to FIG. 1.

A smooth transition between the surface SF and their adjacent base planes BP2 and BP3 is achieved due to the Bezier-function.

The base planes BP2 and BP3 are orthogonal to the base plane BP1 of the permanent magnet PM1.

Figure 3:
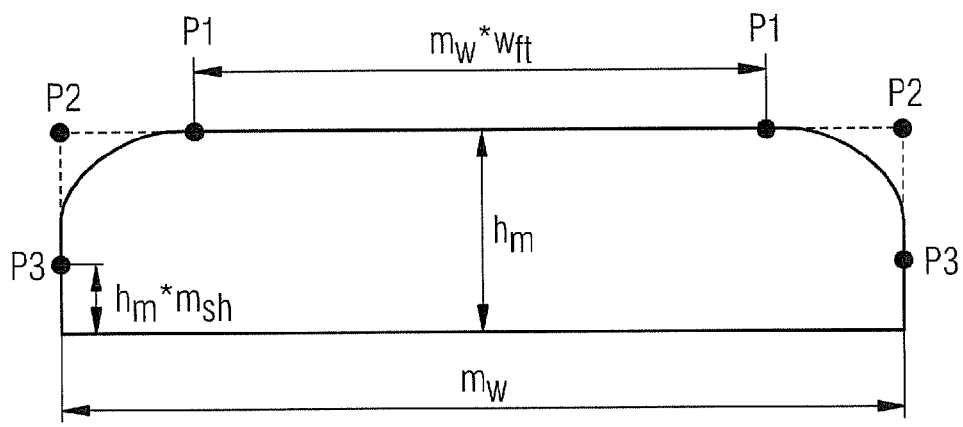

FIG. 3 shows the permanent magnet of FIG. 1 and FIG. 2 with an optimized surface.

As defined above the Bezier-function is calculated between and based on three points P1, P2 and P3.

The parameters used for this are defined as:

$w_{ft}$ control-value; $0<w_{ft}<1$: this value is used to control the width between the two points P1 and therefore the width of a flat top of the magnet is controlled;

$h_m$ total height of the magnet;

$m_w$ width of the magnet;

$m_{sh}$ is a control-value for the point P3; $0<m_{sh}<1$: this value controls the minimum height of the magnet side defined by point P3; while the point P2 is defined by the parameters $h_m$ and $m_w$.

The transition between the surface SF and their adjacent base planes BP2 and BP3 is determined by a Bezier function, defined by and assigned to the three points P1, P2 and P3.

Due to these features an optimized magnet flux density distribution in the air gap and across slots, being used to support the coil, is obtained.

The flat top of the magnet, defined by the two points P1 or defined by the product "$m_w * w_{ft}$", is aligned and adjacent to the air gap.

Preferably the Bezier-shaped transition is determined by help of a numerical design or iteration or by other analytical methods.

Figure 4:
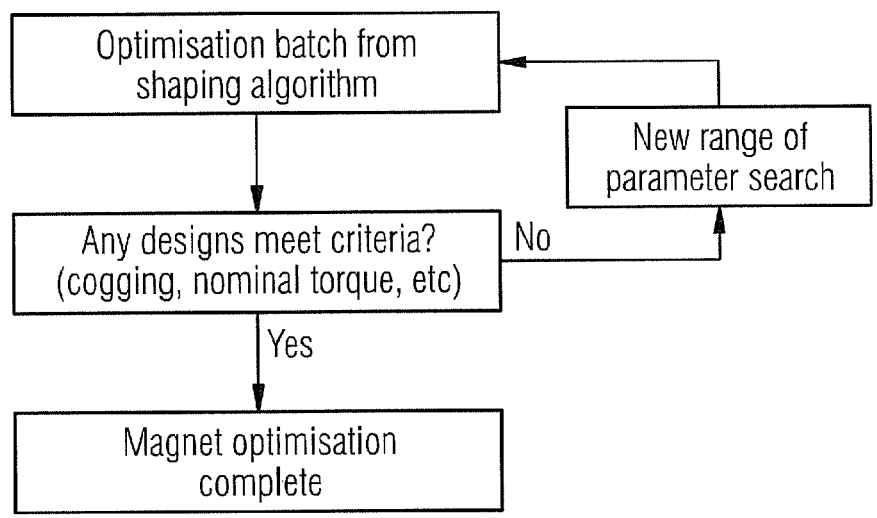
FIG. 4 shows a method for the design and for the optimisation of the shaped surface according to the invention.

FIG. 4 shows a simplified method for the design and for the optimisation of the shaped surface according to the invention.

The method comprises the steps of:

define a number of discrete points to approximate the function as defined above, define the design criteria of the machine layout (such as magnet width mw, torque of the machine, minimum air gap distance, cogging torque, ripple torque, . . . , etc.

run of an optimization algorithm to find a magnet shape that meets all the criteria best.

The invention claimed is:

1. A permanent-magnet, adapted to be used inside an electrical machine, the permanent magnet comprising:

a surface, at least one base plane and a transition area, wherein a first side of the surface is adjacent to the base plane and is connected with the base plane via the transition area, wherein the surface is aligned to a coil and to an air gap of the electrical machine in a way, that magnetic forces of the permanent magnet interact via the surface and the air gap with the coil by a magnetic flux density distribution, and wherein the transition area has a cross-section that is determined by a Bezier function, which is assigned to and defined by three points, including respective first points P1 assigned to respective opposite ends of said at least first side the surface, a second point P2 assigned relative to the transition area and a third point P3 assigned relative to the base plane, and wherein the transition area of the permanent magnet determined by the Bezier-function is based at least on the following control parameters:

a first control parameter $w_{ft}$ having a value in a range from zero to one and configured to control a spacing between the respective first points P1, and a second control parameter $m_{sh}$, having a value in a range from zero to one and configured to control a spacing of the third point P3 relative to the base plane.

2. An electrical machine, comprising:

a coil; and a permanent magnet, wherein the coil interacts with the permanent magnet via an air gap located between the coil and the permanent magnet, the permanent magnet comprising:

a surface having at least a first side;

a base plane adjacent to the first side of the surface; and a transition area, wherein the permanent magnet and the coil are arranged such that electrical power is generated in the coil when there is relative movement between the permanent magnet and the coil, wherein the surface is aligned to the coil and to the air gap such that magnetic forces of the permanent magnet interact via the surface and the air gap with the coil by a magnetic flux density distribution, wherein the first side of the surface is connected to the adjacent base plane via the transition area, wherein the transition area has a cross-section determined by a Bezier function, which is assigned to and defined by three points, including respective first points P1 assigned to respective opposite ends of said at least first side the surface, a second point P2 assigned relative to the transition area and a third point P3 assigned relative to the base plane, and wherein the transition area of the permanent magnet determined by the Bezier-function is based at least on the following control parameters:

a first control parameter $w_{ft}$ having a value in a range from zero to one and configured to control a spacing between the respective first points P1, and a second control parameter $m_{sh}$, having a value in a range from zero to one and configured to control a spacing of the third point P3 relative to the base plane.

3. The electrical machine according to claim 2, wherein a width of the first side of the surface comprising a flat top of the magnet is determined by a product of the first control parameter wft and a width of the magnet mw.

4. The electrical machine according to claim 2, wherein a magnet height corresponding to the third point P3 is determined by a product of the first control parameter $w_{ft}$ and a height of the magnet $h_m$.

5. The electrical machine according to claim 2, wherein a location of the second point P2 is based on a width in, and a height of the magnet $h_m$.

* * * * *